US005691964A

United States Patent [19]

Niederlein et al.

[11] Patent Number: 5,691,964

[45] Date of Patent: Nov. 25, 1997

[54] MUSIC PLAYING SYSTEM WITH DECENTRALIZED UNITS

[75] Inventors: Horst Niederlein, Bingen; Anton Huber, Muenster-Sarmsheim; Armin Frank, Moenchweiler, all of Germany

[73] Assignee: NSM Aktiengesellschaft, Bingen, Germany

[21] Appl. No.: 448,525

[22] PCT Filed: Dec. 20, 1993

[86] PCT No.: PCT/DE93/01235

§ 371 Date: Jun. 14, 1995

§ 102(e) Date: Jun. 14, 1995

[87] PCT Pub. No.: WO94/15416

PCT Pub. Date: Jul. 7, 1994

Related U.S. Application Data

[63] Continuation-in-part of Ser. No. 961,920, filed as PCT/DE91/00560, Jul. 4, 1991, Pat. No. 5,341,350.

[30] Foreign Application Priority Data

Dec. 24, 1992 [DE] Germany .......................... 42 44 198.6

[51] Int. Cl.[6] .............................................. G11B 17/22

[52] U.S. Cl. ........................................ 369/30; 340/825.35

[58] Field of Search ................................. 369/30, 36, 32, 369/34, 33; 340/825.35, 825.06, 825.24, 825.25, 825.15; 455/4.1, 4.2, 5.1, 6.3

[56] References Cited

U.S. PATENT DOCUMENTS

| | | | |
|---|---|---|---|
| 4,232,295 | 11/1980 | McConnell | 340/152 R |
| 4,282,575 | 8/1981 | Hoskinson et al. | 364/479 |
| 4,471,379 | 9/1984 | Stephens | 380/15 |
| 4,499,568 | 2/1985 | Gremillet | 369/30 |
| 5,341,350 | 8/1994 | Frank et al. | 369/30 |
| 5,497,502 | 3/1996 | Castille | 369/34 |

FOREIGN PATENT DOCUMENTS

| | | |
|---|---|---|
| 0082077 | 6/1983 | European Pat. Off. . |
| 0140593 | 5/1985 | European Pat. Off. . |
| 3207022 | 9/1983 | Germany . |
| 4021707 | 1/1992 | Germany . |
| 2178275 | 2/1987 | United Kingdom . |
| 2185361 | 7/1987 | United Kingdom . |
| 2193420 | 2/1988 | United Kingdom . |
| 90/15497 | 12/1990 | WIPO . |
| 92/01342 | 1/1992 | WIPO . |
| 92/22983 | 12/1992 | WIPO . |

OTHER PUBLICATIONS

M. Yoshida et al.: "7 kHz Stereo Communication System for ISDN". In: NTT Review, vol. 4, No. 5, Sep. 1992, Tokyo, Japan, pp. 67–73.

*Primary Examiner*—Tan Dinh
*Attorney, Agent, or Firm*—Spencer & Frank

[57] ABSTRACT

A music playing system includes a number of music playback units with playback changer devices, coding units, and ISDN cards. Each of the music playback units is provided with playable pieces of music. There is at least one input unit by means of which the pieces of music to be played on a playback unit are selected. In addition, there is a central computer with a memory in at least one playback unit, with the memory storing data about the pieces of music available in the playback units. The playback units can be connected between themselves and to the central computer via remote data transmission lines.

17 Claims, 3 Drawing Sheets

MUSIC PLAYING SYSTEM WITH DECENTRALIZED UNITS

CROSS-REFERENCE TO RELATED APPLICATION

This is a continuation-in-part of International Application Serial Number PCT/DE91/00560, filed on Jul. 4, 1991, and subsequently assigned Ser. No. 07/961,920 upon entry into the National Stage in the United States on Jan. 7, 1993 (now U.S. Pat. No. 5,341,350, issued on Aug. 23, 1994).

BACKGROUND OF THE INVENTION

The invention relates to a music playback system. This music playback system comprises a number of music playback units, each having a number of pieces of music at its disposal that can be played back and furthermore a central computer having memory, with a remote data transmission lines connecting the music playback units and the central computer.

In the international patent application PCT/DE91/00560 and in German Offenlegungsschrift DE-A-40 21 707, corresponding to U.S. Pat. No. 5,341,350, an automatic music player system is disclosed having a central unit and a plurality of decentralized terminals which are connected to the central unit. A central music memory is connected to the terminals via remote transmission lines which are suitable for the transmission of audio information. The terminals themselves, i.e. the automatic music players, do not comprise a playback unit. Rather, the desired information , i.e., the selected pieces of music, is retrieved from the central music memory. Thus, relatively inexpensive reproduction terminals and a central music memory having a correspondingly larger capacity can be used. A central computer stores user data of the individual automatic music players and processes the data.

GB-A-2 193 420 describes an automatic music player having a coin unit, a display, an input keyboard and at least one loudspeaker. The automatic music player is connected to a central music memory and computer via a remote data transmission line.

From EP-A-0 140 593, a music transmission system is known which comprises a central music playback unit. A number of consumers are in contact with this central playback unit, with the pieces of music which are transmitted via dedicated cable lines or transmitters then being reproduced in terminals such as, for example, video devices, etc. Unused video channels, for example, are utilized for the information that is to be transmitted. By means of suitable demodulation, the respectively desired piece of music can be selected from several pieces of music that were transmitted and can be listened to.

In a television system according to U.S. Pat. No. 4,471,379, television signals with a number of inverted video images are transmitted in a coded manner and are decoded in the television receiver according to the user identification number that is respectively present so that each user can only receive the television program that was selected and booked by him.

According to a method proposed in WO 90/15497 for the transmission of information from a central unit having a central memory to different consumers or users, the respectively required information is retrieved from the central memory and transmitted to the respective user.

From GB-A-2 185 361, a terminal for private use is known having a coding device and a memory for incoming data, An operating unit as well as a television set and a hi-fi device are provided for the data inquiry and display.

In an information retrieval system for narrow-band and broad-band information described in DE-OS 32 07 022, the broad-band information retrieval center can be configured as an audiovisual information bank having a corresponding control system, from which information bank the broad-band information is retrieved. A digital telephone network or an ISDN network is used as remote data transmission line. If such an ISDN network is used, high transmission rates can be achieved. The data reduction methods used in this process (1 bit reduction method) allow the transmission of music with a high audio quality.

SUMMARY OF THE INVENTION

It is the object of the invention to create a music playback system which is not very complex and which has inexpensive units.

This object is solved in a music playback system which includes a plurality of music playback units; a central computer having a memory that is provided in at least one of the music playback units; at least one input unit for selecting pieces of music that are to be played back on a music playback unit; and remote data transmission lines connecting the central computer to the music playback units and connecting the music playback units to one another, wherein each of the music playback units has a number of pieces of music at its disposal that can be played back, and wherein data about the pieces of music that are available in the music playback units is stored in the memory of the central computer.

The music playback system according to the invention preferably comprises a number of music playback units having a playback changer device, a coding unit and an ISDN card, with the music playback units respectively having a number of pieces of music at their disposal that can be played back. At least one input is provided with which pieces of music that are to be played back by a music playback unit are selected. Furthermore, in at least one music playback unit a central computer having a memory is provided, with at least one playback unit being provided with a memory and with the data of the pieces of music available in the music playback units being respectively stored in the memory of the central computer. The music playback units are connected with one another and to the central computer via a remote data transmission line.

Thus, a central memory for pieces of music that can be played back is not provided but the central music memory is distributed to a specific number of music playback units. These music playback units have a conventional design, i.e., they are provided, for example, with a jukebox having a changer. The boxes thus form the entire memory. In this manner, a decentralized system was created which makes it possible to respectively store pieces of music in individual music playback units according to specific preset factors, e.g., to put together certain listener pieces for certain listening audiences. If such a music playback unit is already installed in a pub, it is not necessary to pay data transmission charges for the retrieval of these pieces of music.

In an advantageous modification of the music playback system according to the invention, this system is provided with a number of terminals having intermediate memory, which are connected to the music playback units, wherein the terminals are provided with an input unit. The intermediate memory may be, for example, a disk, a hard disk, etc.. Thus, a piece of music can be requested from any music playback unit to any another. If the request comes from a terminal which may be connected to the central computer, it is not known where the piece of music in question is stored. This may be contained in one of the music playback units or in a potential further memory.

If the terminals are connected with one another according to a preferred embodiment of the invention, it is also possible to request from a terminal a piece of music which, for example, is stored on a hard disk at another terminal.

The central computer merely carries out central administrative tasks while the music data base is transferred to the music playback units, i.e., the jukeboxes. Thus, a central memory in which all pieces of music are stored is not necessary but transmission charges can be saved if the playback units are placed in a purposeful manner. This purpose is also served by intermediate memories that are provided at the terminals.

The central computer can advantageously store and/or process user data of the individual automatic music players, with a code operating unit and/or money operating unit being respectively provided at the automatic music players and/or at the terminals, with such operating units releasing access to the central computer and the corresponding user data. Thus, the central computer can also execute statistics concerning the frequencies of use, access paths, etc..

According to an advantageous embodiment of the music playback system according to the invention, bidirectional ISDN lines are provided as remote data transmission lines. For this purpose, the music playback units are also provided with an ISDN card in addition to a coding unit. Via the ISDN lines, which are installed according to the direction of the information, data can be transmitted and statistical data as well as compressed data can also be requested. In addition, data transmission to and from the terminals or between terminals is possible. Naturally, the terminals and the music playback units are installed in such a manner that favorable transmission charges apply.

Advantageously, the central computer is a personal computer. This computer can then be installed in the administrative office and contain the data of all the pieces of music in the music playback units. Naturally, corresponding interfaces and cards are provided.

During the execution of a music transmission, this can be played back by a changer in real time, for example, from a record. This is then compressed and transmitted for direct listening. Intermediate storage in the terminal can also take place. The respective piece of music can also be transferred from an intermediate memory of the music data base directly from the terminal to direct transmission. It can also be transmitted from an intermediate memory of the music data base to an intermediate memory at the terminal. Because of the bidirectional ISDN lines, data can also be transmitted from the intermediate memory of a terminal directly to another terminal or to its intermediate memory.

Furthermore, in an advantageous modification of the invention several music centers, each comprising a music playback unit, a central computer, a coding unit and a decoding unit, are connected via remote data transmission lines and are connected via remote data transmission lines to several terminals, each comprising a personal computer and a decoding device. Thus, an optimum exchange of data between the music centers and the terminals that do not comprise a music playback unit is ensured. In this process, a music center advisably functions as main unit. The music centers are each connected to a scanner to simplify the data input. In this manner it is possible to enter the information (images and text) that is contained, for example, on a record cover into the system by means of scanning.

BRIEF DESCRIPTION OF THE DRAWINGS

In the following, the invention is described in greater detail by way of two embodiments and the drawings in which.

DESCRIPTION OF THE PREFERRED EMBODIMENTS

Figure 1:
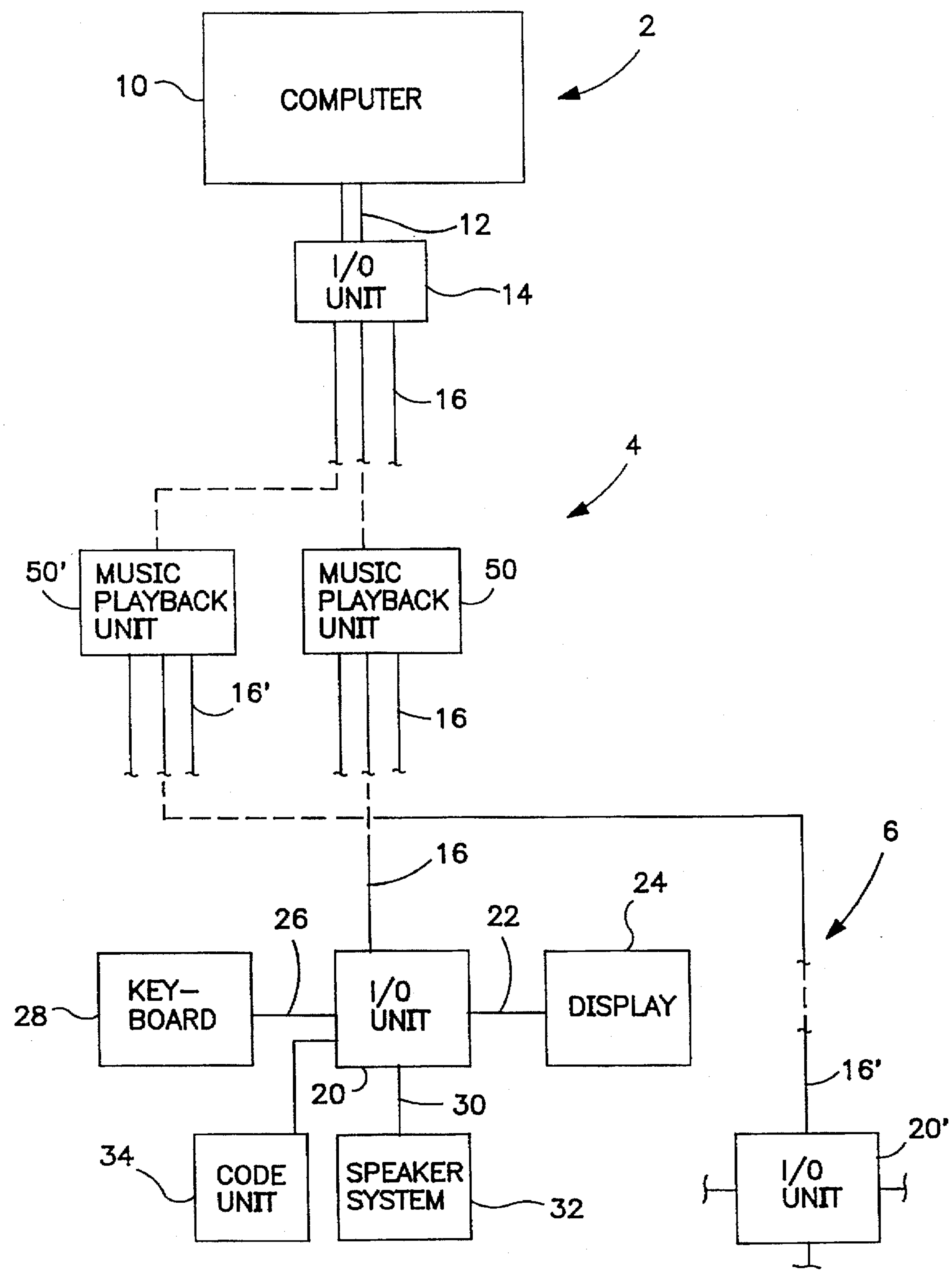
FIG. 1 is a schematic block diagram of a music playback system.

The music playback system that is illustrated schematically in FIG. 1 is provided with a central unit 2 and a number of music playback units 4 as well as with a further number of terminals 6 that are connected to the music playback units 4.

The central unit 2 comprises a computer 10 which may, for example, be a personal computer. To the central unit 2 is connected an input/output unit 14 to which a plurality of remote data transmission lines 16 are connected, with these lines being ISDN lines.

The remote data transmission lines 16 are each connected to a music playback unit 50, 50', etc., which is intended to replace a conventional automatic music player on location. Each music playback unit is provided with a playback changer device, a coding unit and an ISDN card and respectively has a number of pieces of music at its disposal which can be played back.

A plurality of data transmission lines 16, 16', etc., which again are the ISDN lines, are connected to each music playback unit 50. The remote data transmission lines 16 are respectively connected to an input/output unit 20 of a terminal 6 which serves to reproduce music on location. The input/output unit 20 is connected via a line 22 to a visual display unit 24 which represents the display of the terminal. The visual display unit 24 displays, for example, the pieces of music that can be played back by the automatic music player while, for example, the pieces of music, artists, hit lists and the like may be sorted. Furthermore, the input/output unit 20 is connected to an input keyboard 28 via a line 26. The selection commands that are entered via the input keyboard 28 are displayed on the visual display unit 24 and the respectively selected piece of music is made visible or marked. The input keyboard 28 may comprise an actuating key for the final selection. Furthermore, a loudspeaker system 32 is connected to the input/output unit 20 via a further line 30. Additionally, the input keyboard can also be replaced by a touch screen system.

The terminal 6 may be configured such that it merely comprises the input/output units which are required for the selection of pieces of music and the necessary reproduction units such as the loudspeaker system 32. The remaining units may be part of the music playback unit 50 or of the central unit 2 which can execute the processing of the user data depending on the configuration of the music playback system. This purpose is served by a central computer 10 provided in the central unit 2. To safeguard the data that are stored in the central computer 10 and are processed by the same, the external terminal is then provided with a code operating unit 34 which may also be reduced to such an extent that a key word (password) is stored which, when entered, releases access to the computer and the user data. In this manner, the installer of the device can execute accounting and evaluation procedures in a centrally controlled manner. The monitoring and payment of GEMA (GEMA stands for "Gesellschaft für musikalische Aufführungs- und meachanische Vervielfältigungsrechte" [Society for musical Performing and Mechanical Reproduction Rights]) fees is also simplified with such a centralized system.

In the illustrated embodiment of the music playback system according to FIG. 1, the terminals 6 are respectively connected to the music playback units 4. Alternatively, they may also be directly connected to the central unit 2 or with one another.

Figure 2:
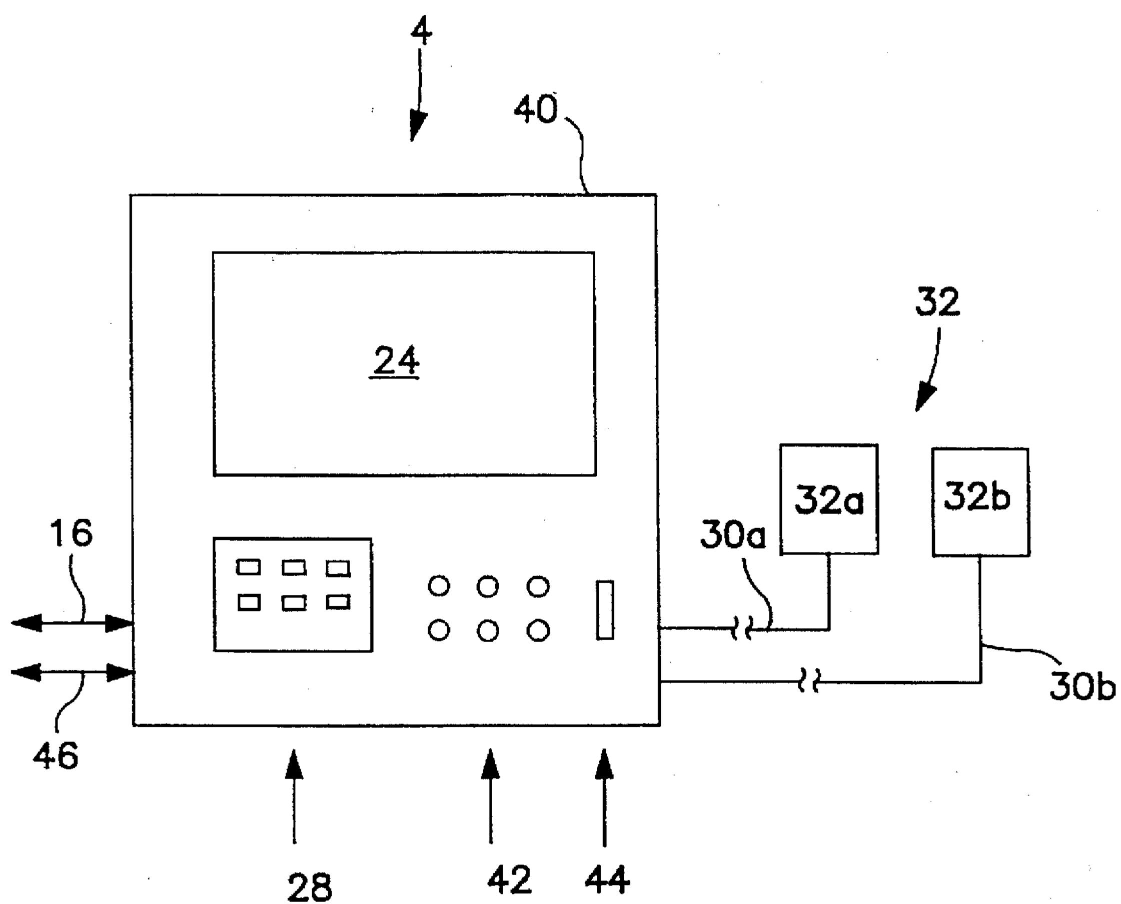
FIG. 2 is a schematic representation of an automatic music player terminal.

The configuration of a terminal is illustrated schematically in FIG. 2. This automatic music player comprises a housing 40 which is provided with a visual display unit 24 and an input keyboard 28. Furthermore, operating buttons and operating keyboards 42 are provided with which the visual display and the loudspeakers 32*a*, 32*b* of the loudspeaker system 32 can be set. They also comprise an on/off switch. In addition, a slot 44 is provided at the front side of the housing 40 to receive magnetically coded cards instead of or in addition to a conventional coin unit. The housing 40 is provided with a connection for a remote data transmission line 16. Furthermore, a connection for a power supply cable 46 is provided.

Figure 3:
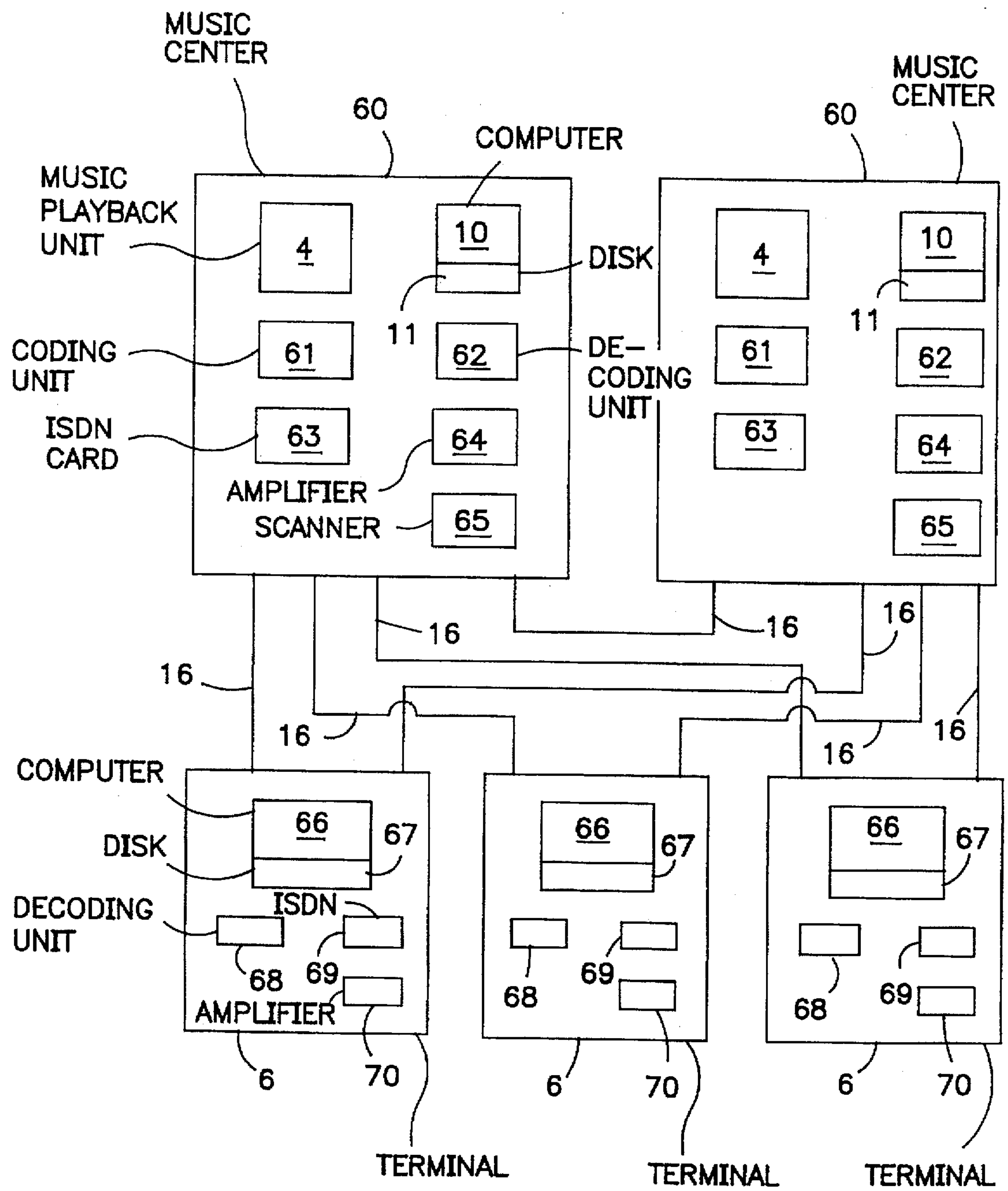
FIG. 3 is a schematic block diagram of an alternative music playback system.

In the music playback system illustrated in FIG. 3, two music centers 60 are connected with one another and with three terminals 6 via remote data transmission lines 16. Naturally, the number of music centers 60 and the number of terminals 6 can be increased arbitrarily. Each music center 60 comprises a music playback unit 4, a central computer 10 having a hard disk memory 11 allocated to it, a coding unit 61, a decoding unit 62, an ISDN card 63, an amplifier 64 and a scanner 65. By way of the scanner 65, any information, in particular, the record cover images, can be entered into the music center 60. For a simplified and secure data transmission, one of the music centers 60 is designed as main unit. The individual terminals 6 each comprise a personal computer 66 with an associated hard disk memory 67, a decoding device 68, an ISDN card 69 and an amplifier 70. A visual display and an operator terminal are respectively allocated to both the computer 10 of the music center as well as the personal computer 66 of the terminal 6. The music playback system thus ensures an optimum data exchange between the music centers 60 and the terminals 6.

What is claimed is:

1. A music playback system, comprising:

a plurality of music playback units;

a central computer having a memory that is provided in at least one of the music playback units;

at least one input unit for selecting pieces of music that are to be played back on a music playback unit; and lines connecting the central computer to the music playback units and connecting the music playback units to each other, wherein each of the music playback units has a number of pieces of music at its disposal for playback, and wherein data about the pieces of music that are available in the music playback units is stored in the memory of the central computer but the pieces of music themselves are not stored in the memory of the central computer.

2. A music playback system according to claim 1, further comprising a plurality of terminals each having an intermediate memory, the terminals being connected to the music playback units, and wherein each at least one input unit is provided at a respective one of the terminals.

3. A music playback system according to claim 2, wherein the terminals are connected to said central computer.

4. A music playback system according to claim 2, wherein said terminals are connected with one another.

5. A music playback system according to claim 2, wherein said central computer stores or processes user data of the individual music playback units, and wherein code operating units are respectively provided at the music playback units or at the terminals, with such code operating units releasing access to the central computer and the corresponding user data.

6. A music playback system according to claim 1, wherein the remote data transmission lines are bidirectional ISDN lines and the music playback units are provided with an ISDN card.

7. A music playback system according to claim 1, wherein said central computer is a personal computer.

8. A music playback system according to claim 1, wherein said music playback units are provided with a playback changer device and a coding unit.

9. A music playback system according to claim 1, wherein a plurality of music centers, each comprising a music playback unit, a central computer, a coding unit and a decoding unit, are connected via remote data transmission lines to a plurality of terminals each comprising a personal computer and a decoding unit.

10. A music playback system according to claim 9, wherein a music center functions as main unit.

11. A music playback system according to claim 9, wherein each of said music centers is connected to a respective scanner.

12. A music playback system according to claim 2, wherein money operating units are respectively provided at the music playback units or at the terminals.

13. A music playback system, comprising:

a first music playback unit where a plurality of first pieces of music are stored;

a second music playback unit where a plurality of second pieces of music are stored, at least some of the second pieces of music being different from the first pieces of music;

a first input unit connected to the first music playback unit for selecting pieces of music, including the second pieces of music, that are to be played back on the first music playback unit;

a second input unit connected to the second music playback unit for selecting pieces of music, including the first pieces of music, that are to be played back on the second music playback unit;

a central computer that stores data about the pieces of music that are available in the first and second music playback units; and means for communicating between the first music playback unit, the second music playback unit, and the central computer.

14. A music playback system according to claim 13, wherein the means for communicating comprises data transmission lines.

15. A music playback system according to claim 13, wherein the first music playback unit comprises a first playback changer device for recordings and the second music playback unit comprise a second playback changer device for recordings.

16. A music playback system according to claim 15, wherein the means for communicating comprises ISDN lines, wherein the first music playback unit further comprises a first ISDN card, and wherein the second music playback unit further comprises a second ISDN card.

17. A music playback system according to claim 13, wherein the central computer carries out central administrative tasks but does not store pieces of music.

* * * * *